United States Patent [19]
Francis et al.

[11] Patent Number: 5,857,917
[45] Date of Patent: Jan. 12, 1999

[54] 3-D SIMULATOR RIDE

[76] Inventors: Mitchell J. Francis, 3136 Dona Sofia Dr., Studio City, Calif. 91604; Gary H. Packman, 15245 Mulholland Dr., Los Angeles, Calif. 90077

[21] Appl. No.: 260,831

[22] Filed: Jun. 16, 1994

[51] Int. Cl.⁶ .................................................. A63G 31/04
[52] U.S. Cl. .............................. 472/60; 472/130; 434/55
[58] Field of Search .......................... 472/59, 60, 61, 472/130; 434/55

[56] References Cited

U.S. PATENT DOCUMENTS

| | | | |
|---|---|---|---|
| 4,066,256 | 1/1978 | Trumbull | 472/60 |
| 4,855,842 | 8/1989 | Hayes et al. | |
| 4,885,878 | 12/1989 | Wuu | 52/6 |
| 4,907,860 | 3/1990 | Noble | |
| 4,962,420 | 10/1990 | Judenich | 472/61 X |
| 5,026,152 | 6/1991 | Sharkey | 352/85 |
| 5,433,670 | 7/1995 | Trumbull | |

*Primary Examiner*—Kien T. Nguyen
*Attorney, Agent, or Firm*—Aquilino & Welsh

[57] ABSTRACT

A 3-D simulator amusement ride dimensioned to fit within existing buildings having 12 to 15 foot high ceilings. The ride includes a motion base formed in a hexagonal pattern with up to six degrees of freedom of movement, a passenger enclosure supported upon the motion base, a 3-D video image system attached to the enclosure and a computerized control system which functions to synchronize the movement of the enclosure to a projected 3-D video.

4 Claims, 6 Drawing Sheets

3-D SIMULATOR RIDE

BACKGROUND OF THE INVENTION

1. Field of the Invention

The present invention relates to an amusement ride which simulates the motion of three-dimensionally projected video images.

2. Description of the Prior Art

There are various prior art patents which relate to amusement ride simulators, some as old as the U.S. Pat. No. 892,070 patent to Murphy which issued in 1908. Others including the likes of U.S. Pat. No. 1,844,852 to Harvey; U.S. Pat. No. 1,789,680 to Gwinnett; U.S. Pat. No. 2,861,806 to Disney; U.S. Pat. No. 4,066,256 to Trumbull; U.S. Pat. No. 4,251,140 to Fogerty, Jr.; U.S. Pat. No. 4,874,162 to Trumbull et al.; U.S. Pat. No. 4,879,849 to Hollingsworth, III et al.; U.S. Pat. No. 4,885,878 to Wuu and U.S. Pat. No. 5,071,352 to Denne, having been developed over the years. None of the prior patents have set forth an amusement ride which projects 3-D motion videos in combination with a motion base having up to six degrees of freedom of movement, although 3-D technology is known, such as taught by U.S. Pat. No. 4,907,860 to Nobel. Simulator amusement rides are known to use frames of optically recorded images on film and not fields of electronically encoded video data on disc. Film formats are not suitable for numerous repeat 3-D projections because the picture quality degenerates.

Also, the prior art has not recognized the need to design amusement rides of this type in a way to be able to physically fit into the existing buildings located in premier tourist-traffic locations.

SUMMARY OF THE INVENTION

The present invention is directed to an amusement ride including a motion base with a plurality of actuators and a video imaging system designed to fit in buildings with ceilings 12 to 15 feet high. In the preferred embodiment the motion base has six degrees of motion and supports a passenger enclosure. A true flight simulator uses an enclosed capsule, which moves the entire enclosure including the screen, projectors and seats and is considered the truest simulation of motion because all of the user's senses are completely controlled within the enclosed space. There is no outside peripheral vision of non-moving elements to distract the user and lessen the simulated movements.

The image system used in the present invention can be either analog or digital and includes a large screen and two laser video disc players and projectors which are synchronized with one another and a computer control system to project a three-dimensional picture when viewed through polarized or other 3-D glasses such as alternating on/off left and right fields.

The computer control receives time coded signals from the lasers reading the disc and then synchronizes the movement of the base to correspond with the image being projected. The computer may also control various other aspects such as wind machines, seat vibrators, lights and automatic doors on the passenger enclosure.

It is an object of the present invention to provide an amusement ride with a motion base which incorporates the use of 3-D video disc technology in order to produce a simulated experience, without film degeneration and without the need for rewind time.

Another object of the invention is to provide an amusement ride with a six degree of freedom motion base supporting a passenger enclosure which fits within buildings having ceilings 12 to 15 feet high.

Other objects and advantages of the present invention will become apparent from the following detailed description when viewed in conjunction with the accompanying drawings, which set forth certain embodiments of the invention.

DESCRIPTION OF THE PREFERRED EMBODIMENTS

The detailed embodiments of the present invention are disclosed herein. It should be understood, however, that the disclosed embodiments are merely exemplary of the invention, which may be embodied in various forms. Therefore, the details disclosed herein are not to be interpreted as limited, but merely as the basis for the claims and as a basis for teaching one skilled in the art how to make and/or use the invention.

Figure 1:
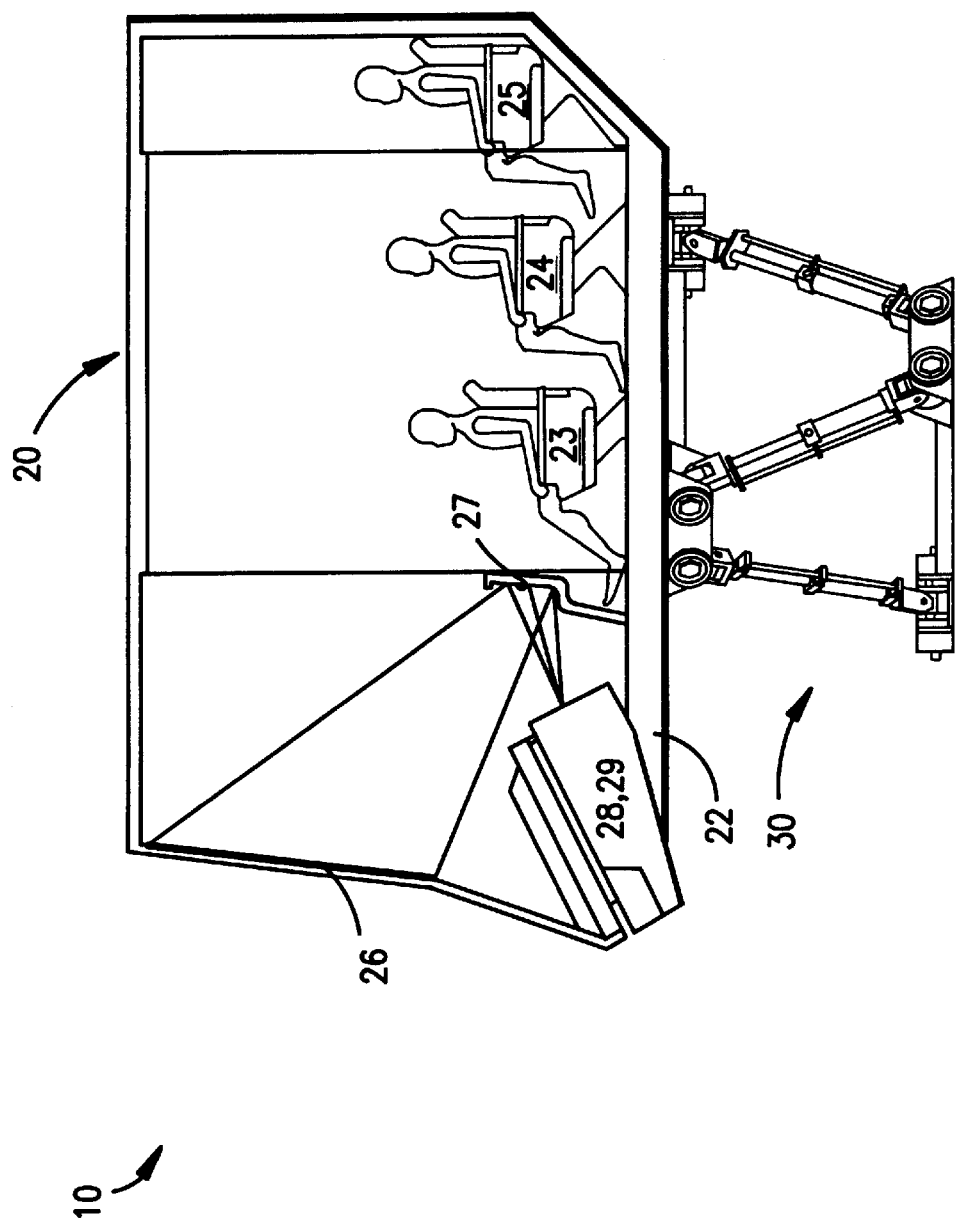
FIG. 1 shows a side view of the preferred embodiment with the side wall of the capsule cut-away.

Turning to FIG. 1, a first capsule embodiment 10 of the invention is shown. In this design a capsule 20 with a bottom platform 22 is mounted upon motion base 30. The capsule 20 is dimensioned to seat fifteen riders and includes three rows of seats 23, 24 and 25 generally with five seats in each row. The seating area generally is 10 feet wide, 10 feet long and 8 feet high. Enclosed within and attached to capsule 20 is a big screen 26, a reflector 27 and a pair of side by side laser video disc players and projectors 28 and 29.

Figure 6:
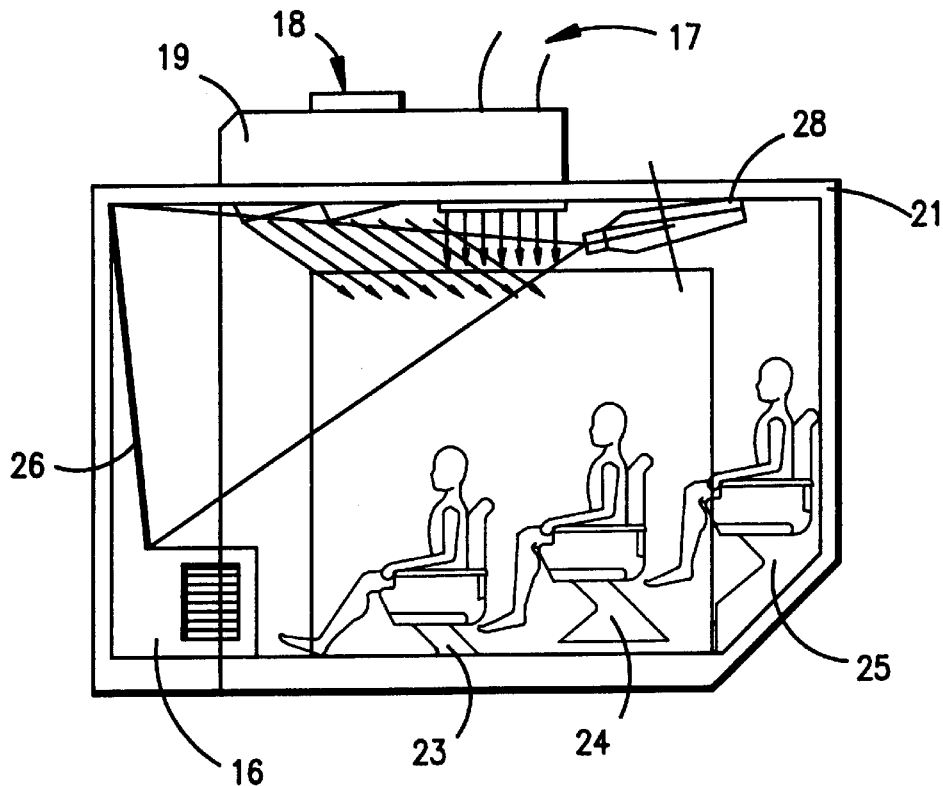
FIG. 6 shows a side view of a second embodiment of the capsule with the side wall cut away.
Figure 7:
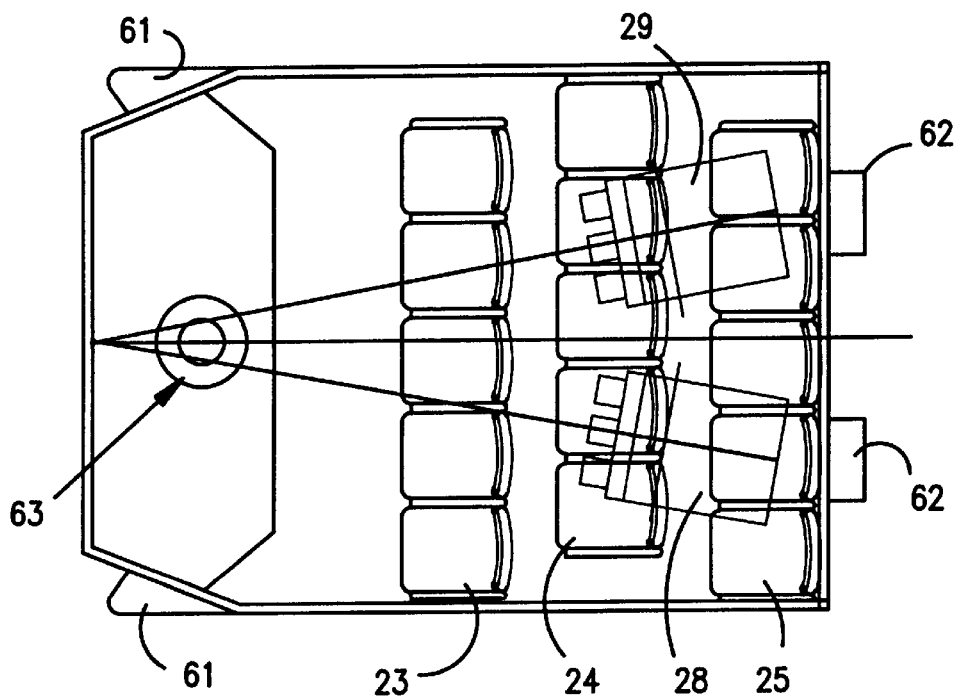
FIG. 7 shows a top view of the capsule in FIG. 6 with the top wall cut away.

FIGS. 6 and 7 show a second preferred capsule embodiment 100 which again includes three rows of seats 23, 24 and 25 and a big screen 26. In this embodiment, the laser disc players and projectors 28 and 29 are mounted to the top wall 21 of the cabin. Mounted on top of capsule 100 is a duct system 19 and a fan 18 which cooperates with the duct to simulate wind within the cabin. Also cooperating with duct 19 is an air conditioner duct 17 for pumping fresh air into the capsule, which is exhausted through exhaust fan 16.

The speaker layout 60 is best seen in FIG. 7, which includes front side speakers 61, rear side speakers 62 and a center channel sub-woofer 63.

Figure 2:
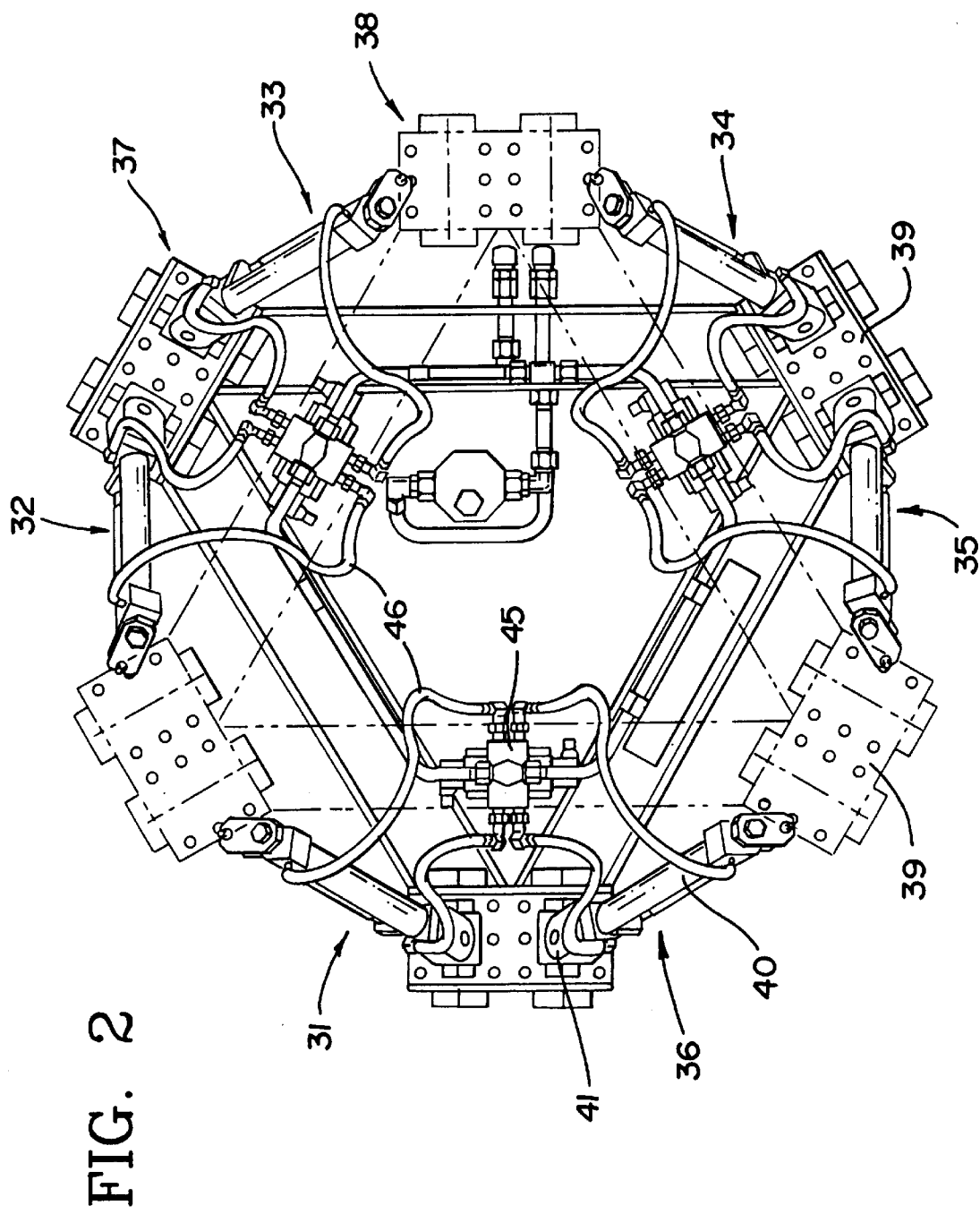
FIG. 2 shows a top view of the motion base assembly.

FIG. 2 shows a top view of motion base 30 of FIG. 1. The motion base includes six servo actuator legs 31–36 arranged in a symmetrical hexapod configuration, a lower platform 37 and an upper platform 38 shown in dotted lines. The actuators are interconnected by a conventional hydraulic system including accumulators 45 and various plumbing 46. Each servo actuator consists of an 18 inch stroke hydraulic cylinder 40, servo valve, feedback transducers and two universal joints 41. The upper and lower platforms including three U-joint pads 39, each having two U-joints for connection to opposed actuators.

When at rest, the upper platform 38 is spaced from the lower platform 37 by between approximately 26.1–43 inches and spaced no more than between 48.6–65.5 inches when fully raised apart. The composite height of the capsule and motion base is less than 12–15 feet, which allows the unit 10 to be installed and operational in existing buildings with 12 to 15 foot ceilings.

Figure 3:
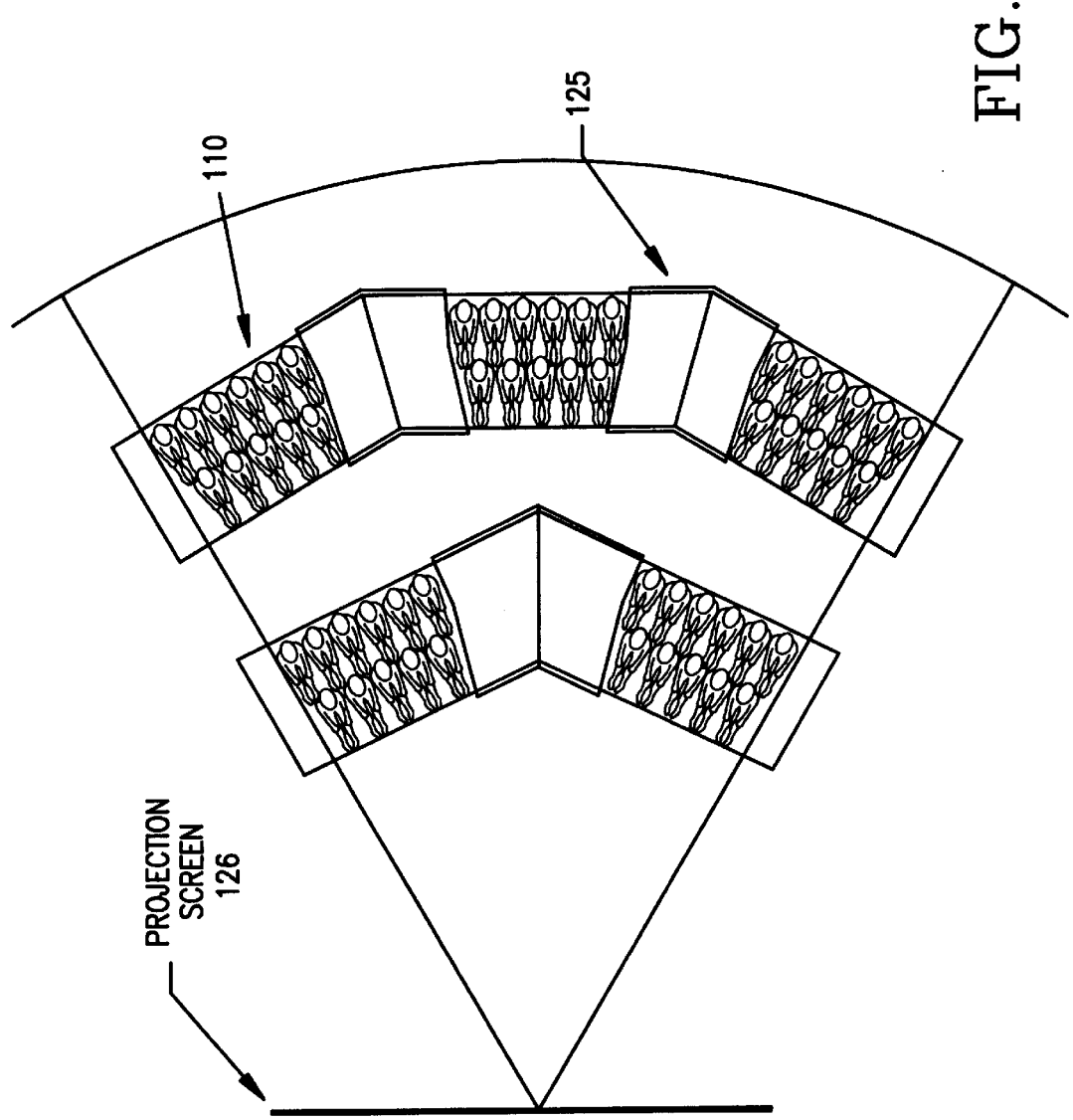
FIG. 3 shows a top view of a second theater-type embodiment.
Figure 4:
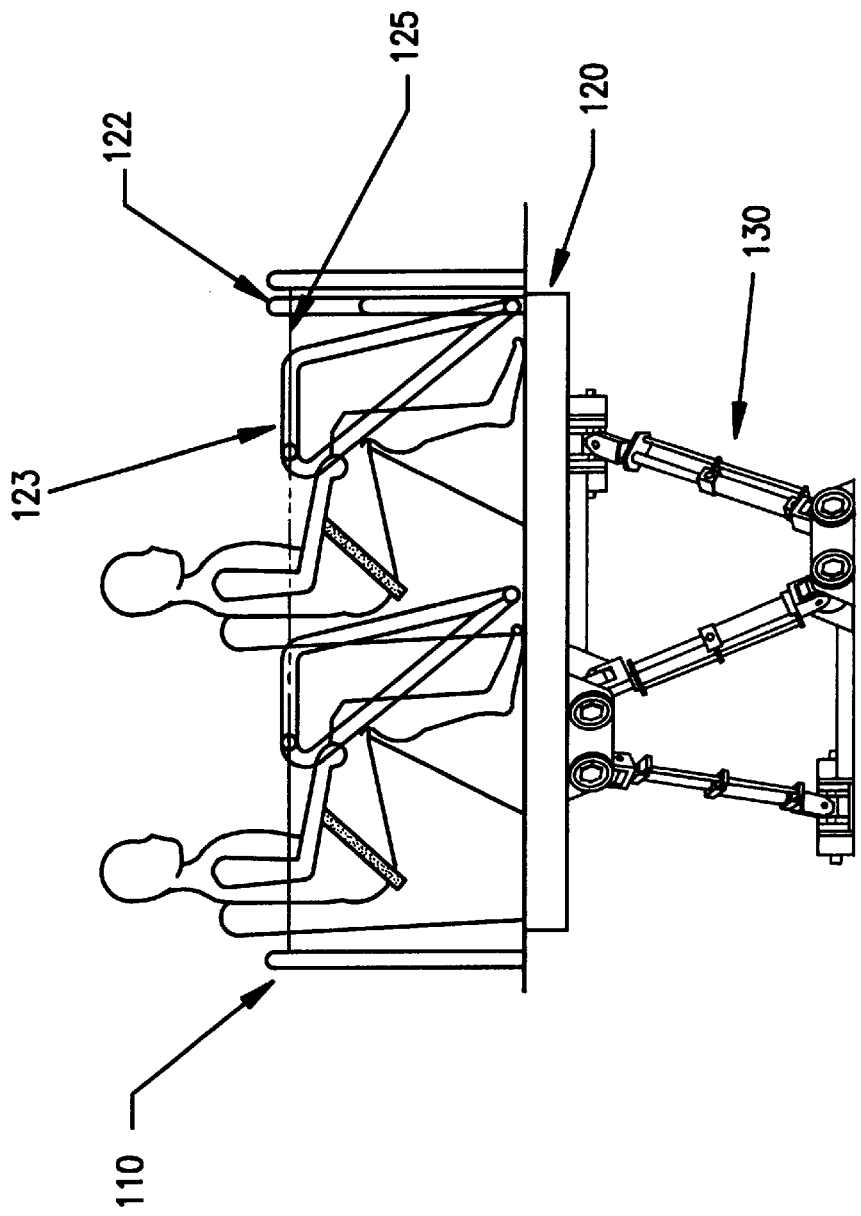
FIG. 4 shows a side view of a motion platform and base used in the second embodiment.
Figure 5:
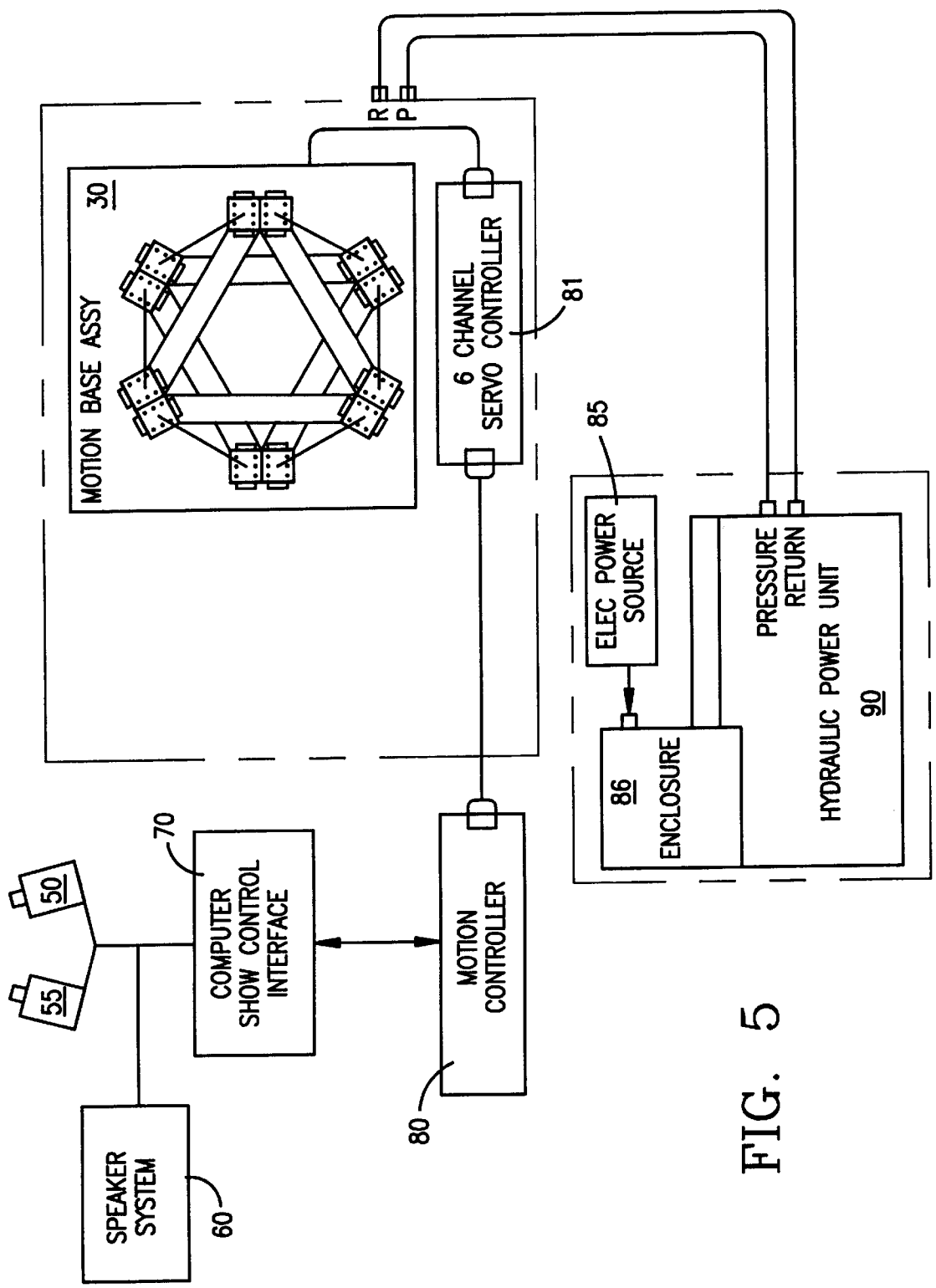
FIG. 5 shows a block diagram of the overall operational system.

In a second embodiment, as shown in FIGS. 3 and 4, an open eleven man platform 120 is connected to a motion base 130. A plurality of units 110 are arranged in a theater environment where a central projection screen 126 is employed. Each unit 110 includes an access ramp 125 with hand railing located at each side of the seating platform 120. The ramps are lowered as in FIG. 3 to permit riders to load and unload from the platform and retracted as in FIG. 4 during operation of the amusement ride. In this embodiment, front and rear railing 122 and lap bars 123 are used for rider safety, however, in other embodiments, seat belts and/or lap bars could be employed.

The projection system of the present invention is unique in that 3-D video technology is combined with a moving capsule. The 3-D images are recorded on laser disc which allows for precisely coded motion signals and rapid projector movement during viewing without losing picture quality.

The system currently requires two video projectors 50 and 55 stereoscopically related and synchronized together. The two projectors are usually positioned side by side to correspond to a viewer's left and right eyes, however, they could be stacked one above the other. When the stereo pictures are reproduced on a common screen, usually one is projected with vertically polarized light and the other is projected with horizontally polarized light. The two pictures are superimposed on each other and the viewer uses special glasses with polarized filter lenses such that the left lens filters out the right video images and the right lens filters out the left video images. The resulting picture provides an excellent illusion of three-dimensional depth, and adds realism to the video. It should be understood that vertically and horizontally polarized filters are just one method of producing 3-D images, and the present invention contemplates using two kinds of circular polarized filters as well as numerous other techniques.

The motion base 30 is powered by an electrical power source 85 and a hydraulic power unit 90 which features a 25–40 gallon reservoir, one 25 hp pump and an integrated motor starter enclosure 86. An output filter (not shown) assures cleanliness for the hydraulic fluid and a circulation type air-oil heat exchanger (not shown) provides cooling for the fluid. The motion controller 80 is electronic and operates six servo controllers 81 and logic to start and stop the hydraulic power.

In operation, pre-recorded 3-D right and left eye laser discs are inserted into the laser video projectors 50 and 55, respectively. The video signals on each disc are projected on a common screen, the audio signals are sent to a speaker system 60 and time coded information is sent to computer show control interface 70. The computer 70 processes the time code information and sends it on to a motion controller 80 which functions to control the hydraulic system to actuate the actuators 31–36 to create motion in six degrees of freedom. The motion created corresponds simultaneously to both the video images being displayed and the audio being heard. The riders view the projected video with glasses which allow 3-D viewing. While viewing they also experience motion via the motion base and special effects of wind via fans and seat vibrations via vibrators which are all controlled by computer 70.

While various preferred embodiments have been shown and described, it will be understood that there is no intent to limit the invention by such disclosure, but rather, is intended to cover all modifications and alternate constructions falling within the spirit and scope of the invention as defined in the appended claims.

We claim:

1. An amusement ride apparatus comprising:

a motion base with up to six degrees of freedom of motion including a plurality of actuators supporting a platform;

a passenger holding means secured to said platform and including a plurality of seats;

a digital storage medium storing 3-D video information;

a 3-D video image means including a screen and a digital video player with dual projectors attached to move with said platform wherein said digital video player projects a 3-D picture on said screen based upon 3-D video information stored on said digital storage medium; and a motion control system including a computer which receives digital signals encoded on said digital storage medium for moving said platform in correspondence with said 3-D video information and said projected image.

2. The amusement ride of claim 1 wherein said passenger holding means includes a housing for enclosing said seats and said image means.

3. The amusement ride of claim 2 wherein said motion base and said housing are dimensioned so as to allow the ride to be installed and fully operational in a building with 15 foot ceilings.

4. The amusement ride of claim 1, wherein the digital video player is two laser video disc players.

* * * * *